2 Sheets—Sheet 1.

E. C. F. OTTO.
Velocipede.

No. 212,492. Patented Feb. 18, 1879.

WITNESSES
Wm A Skinkle
Wm T Kilgrove

INVENTOR
Edward C. F. Otto.
By his Attorneys
Baldwin, Hopkins & Peyton

2 Sheets—Sheet 2.
E. C. F. OTTO.
Velocipede.
No. 212,492. Patented Feb. 18, 1879.
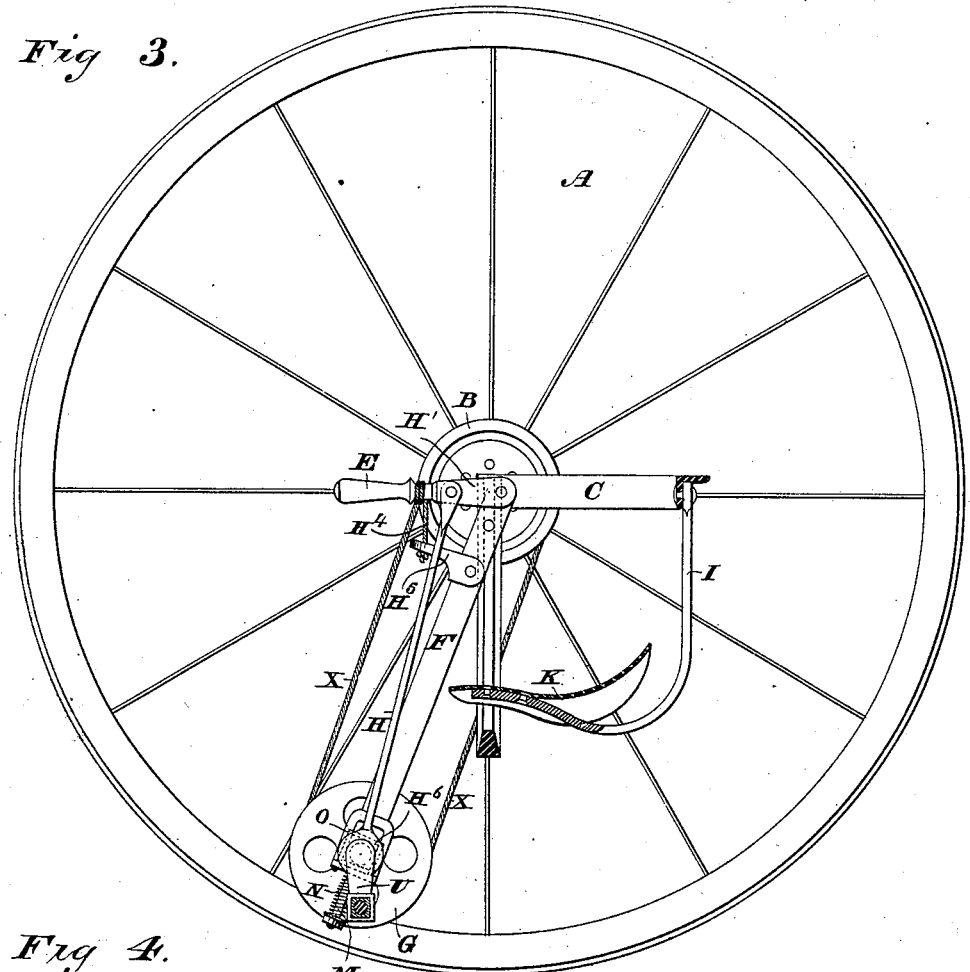
Fig. 3.
Fig. 4.
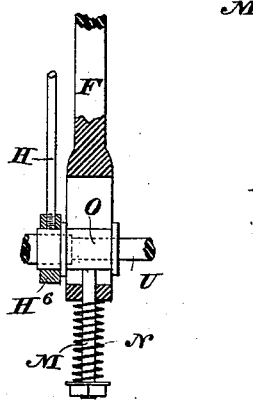
Fig. 5.
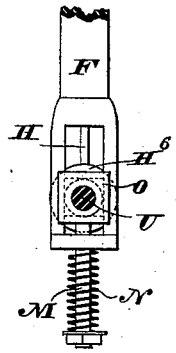
WITNESSES
Wm A. Skinkle
Wm T. Kilgrove
INVENTOR
Edward C F Otto.
By his Attorneys
Baldwin, Hopkins & Peyton.

UNITED STATES PATENT OFFICE.

EDOUARD C. F. OTTO, OF ALBANY STREET, MIDDLESEX COUNTY, ENGLAND.

IMPROVEMENT IN VELOCIPEDES.

Specification forming part of Letters Patent No. 212,492, dated February 18, 1879; application filed April 1, 1878; patented in England, July 18, 1877.

*To all whom it may concern:*

Be it known that I, EDUOARD CARL FRIEDRICH OTTO, of Albany Street, in the county of Middlesex, London, England, a subject of the Queen of Great Britain, have invented certain new and useful Improvements in Bicycles, of which the following is a specification:

My invention relates to improvements in two-wheeled velocipedes or bicycles of the class provided with suspended seats, having the center of gravity placed below the wheel-hubs, by which improvements facility and ease are afforded in the use of such vehicles, while at the same time they may readily be controlled, and risk of their upsetting is avoided.

The subject-matter claimed will hereinafter specifically be designated.

Figure 2:
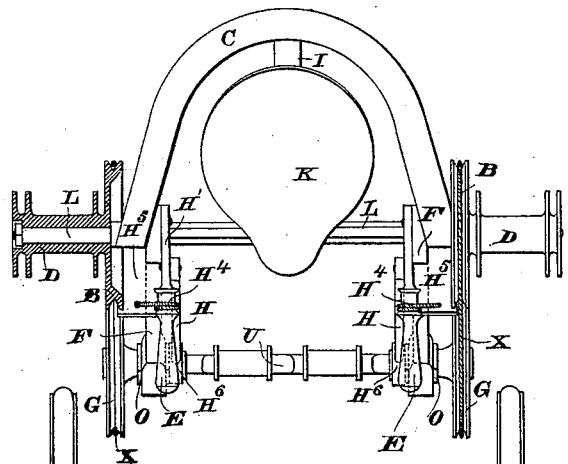
Figure 1:
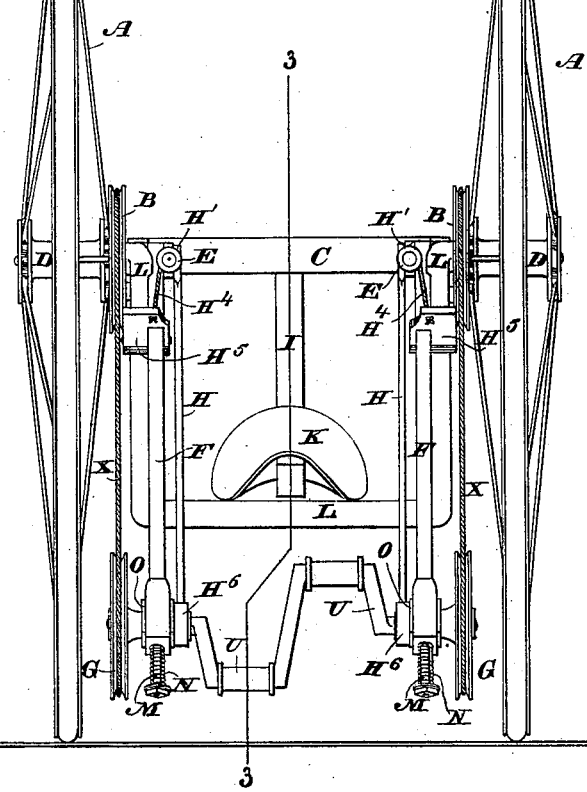

In the accompanying drawings, Figure 1 is a front elevation of a bicycle embodying all my improvements. Fig. 2 is a plan view of the same, showing the hubs and driving-pulleys of the large carrying-wheels in their proper positions on the axles, but with the spokes and fellies of the wheels omitted, one of the hubs and its driving-pulley being shown in section. Fig. 3 is a vertical section through my improved vehicle on the line 3 3 of Fig. 1. Figs. 4 and 5 are views showing the construction of some of the parts in detail.

In carrying out my invention I employ two large supporting-wheels, A A, loosely secured on the ends of a centrally depressed or cranked axle, L, so that they may revolve thereon independently of each other. Between these wheels, below their hubs, and secured to or connected with the axle L at its ends or elevated portions, I place a seat, K, preferably of a saddle shape. This suspended seat is fixed over the central or depressed portion of the axle by a spring, I, which is connected to and depends from the middle of a strengthening-bar or seat-supporting bow-like frame, C, curving rearwardly from its ends, which are secured to the axle ends inside the supporting-wheels A A. This bar C forms the seat-back, which is thus located about on a level with or in the horizontal plane of the axle ends. It serves as a firm support for the back of the rider, who, when in his seat, occupies a position sufficiently elevated to bring his head above the level of the wheel-hubs and afford him a good view ahead, as well as sidewise through the wheels, between the spokes, and lessens the annoyance occasioned by mud, dust, &c., arising or thrown up from the roadway by the wheels.

On both sides of the axle-center, or upon the inner portions of its elevated ends, are attached two down-hanging steel rods, F F, one at each end of the axle, which rods hold in their lower ends, by means of adjustable or vertically-sliding boxes O O, the opposite ends of a treadle-crank, U, provided with foot-rests. Two upwardly-projecting steel rods, H H, are attached to or connected at their lower ends with these sliding boxes O O by means of loosely-fitting rings $H^6$, one for each box. At their upper ends these rods H H are fastened to levers $H^1$ $H^1$ by means of screw bolts and nuts. These levers and their handles E E are above and on opposite sides of the seat, within convenient reach of the hands of the rider, and the levers are attached by pivots to the rods F F, at or near their upper ends, at about their juncture with the axle L.

The levers, handles, and controlling-rods H H constitute, in connection with other devices presently to be described, the steering-gear of the vehicle.

Each steering-handle E is movable, being loosely secured on its lever $H^1$, so as to revolve thereon, and the handles are respectively connected by means of a gut string, cord, or wire, $H^4$, with a brake, $H^5$. The brake-blocks $H^5$, one for each handle, are pivoted upon the rods F F, and when the handles are turned to wind up the string, or are elevated by the rider, the brakes are drawn against pulleys B B, or either brake is brought to bear against its respective pulley, as occasion may require.

The pulleys B B are firmly attached to or connected with the large supporting-wheels. These pulleys are connected, by gut or other suitable bands X X, with corresponding pulleys G G, which are securely attached to the cranked driving-shaft or treadle-axle U, by set-screws or otherwise, so as to be removable.

Springs N N (either coiled springs or rubber tubes or thimbles) are secured upon downwardly-projecting studs or rods M M, fastened or rigidly attached at their upper ends to the under sides of the sliding boxes O O, and passing through holes in the bottom of the box-housings or bases of the openings in the lower ends of the rods F F. These expansive springs act with a tendency to draw down the boxes and keep the bands X taut, while admitting of the boxes being readily moved upward, together or separately, by endwise movement of the controlling-rods H H when acted upon by the handles E.

The wheels A A and pulleys B B are preferably constructed, as shown, with thin iron or steel wire spokes, connecting the wheel-hubs and steel rims, as well as said rims and the pulley-rims. Other suitable constructions may be adopted, however, and I do not claim herein any peculiarities of the supporting wheels and pulleys.

In order to drive the bicycle, the rider takes the seat K and raises both the handles E E. Such upward movement causes the sliding axle-boxes O O to move upward, and loosens both the gut bands X X, which connect the pulleys. The rider then moves, by means of his feet, the treadles to the most favorable position for starting. After this is done the rider drops the handles E and loosens or tightens the gut bands X, according to the speed he intends to give the respective wheels A A; for if he lifts the right handle, the right-hand pulleys will begin to slip, or not act at all, and by so doing the large wheel on the same side will either be retarded or brought to a dead-stop.

If the rider goes downhill, he can stop both wheels by putting on the brakes $H^5 H^5$. His body has then to be thrown backward to counteract the inclination of the bicycle-seat to be lifted backward by the friction of the brake on the pulleys B B. These brakes can be used independently from the steering-lever $H^1$, as they are loose, and give the machine a great number of movements. For instance, the rider, in going downhill, may either simply put on the brakes $H^5 H^5$, or he may pull the levers H and $H^1$ a little and turn the handles sufficiently to cause friction on the pulleys by the brakes and by the gut bands. This enables him to keep his feet still in the best position on the crank U U to counteract the inclination of being lifted backward, for neither swinging nor lifting up can happen, as both feet place the center of gravity almost entirely on the treadle-crank U U. Although at first sight the seat appears liable to oscillation, yet in practice it will be found that it is very steady, owing to the control exercised over the vehicle at will by the feet of the driver.

A small wheel having the hub made in two halves can be attached in any convenient manner to the center of the treadle-crank U U, between the pulleys G G. By this means I may obtain a third and additional wheel without necessitating any modification in the primary construction of the machine, and it is thus capable of being used as a tricycle. Such supplementary wheel, being a little larger than the pulleys, throws the crank more forward.

The gut bands X X may, if desired, be crossed on the pulleys and the crank turned the reverse way, thus still impelling the bicycle forward.

Having now particularly described and ascertained the nature of my said invention, and the manner of carrying the same into effect, I would have it understood that I claim—

1. The combination of the large supporting-wheels, the centrally depressed or cranked axle, the rearwardly-curved seat-supporting frame or back, fixed to the axle ends and on or about on a level with them, the seat-supporting spring, secured to the seat-back, and the depending seat between the wheels, beneath their hubs, and over the central or depressed part of the axle, as and for the purposes specified.

2. The combination of the large supporting-wheels, the centrally depressed or cranked axle, the horizontally and rearwardly curved seat-supporting frame or back, fixed at its ends to the axle, the depending seat, the suspended crank-shaft beneath the seat, and having foot-rests for the operator, the pulleys on said shaft, the pulleys on the wheel-hubs, and the connecting-bands, all these members being and operating substantially as hereinbefore set forth.

3. The combination of the supporting-wheels, the pulleys thereof, the vertically-adjustable suspended crank-shaft, the pulleys thereon, and the band-connections between the crank-shaft pulleys and the pulleys of the supporting-wheels, substantially as and for the purposes set forth.

4. The combination, substantially as hereinbefore set forth, of the supporting-wheels, the cranked axle, the rods F F, the sliding boxes, the crank-shaft provided with foot-rests and pulleys, and the controlling-rods H H, by which the rider is enabled, by means substantially such as described, to adjust the boxes and raise and lower the crank-shaft, for the purpose specified.

5. The combination, substantially as hereinbefore set forth, of the large supporting-wheels, the axle, the depending seat, the adjustable crank-shaft suspended from the axle, the sliding boxes in which it is mounted, the controlling-rods, the levers to which said rods are pivoted, and the brakes acting upon the pulleys of the supporting-wheels.

6. The turning and vertically-adjustable handles E E, connected with the brakes, substantially as and for the purpose set forth.

7. The combination of the pulleys on the supporting-wheels, the vertically-adjustable crank-shaft, the pulleys thereon, the driving-bands, the pivoted levers, their handles, the brakes, and the controlling-rods, connected with said levers and serving to adjust the crank-shaft boxes, these members being constructed and operating substantially as hereinbefore set forth, whereby the brakes may be applied separately or together, and be operated simultaneously with or independently of the adjustment of the crank-shaft, as described.

E. C. F. OTTO.

Witnesses:
  SHIRLEY BOWDEN,
    *Patent Agent, London.*
  GEORGE HENRY PRIEST,
    10 *East Harding Street,*
        *Fetter Lane, E. C.*